(12) United States Patent
Finkenzeller et al.

(10) Patent No.: US 8,358,232 B2
(45) Date of Patent: Jan. 22, 2013

(54) DEVICE FOR ACTUATING AN ACTUATOR

(75) Inventors: Klaus Finkenzeller, Unterföhring (DE); Emil Knies, Gräfelfing (DE)

(73) Assignee: Giesecke & Devrient GmbH, Munich (DE)

( * ) Notice: Subject to any disclaimer, the term of this patent is extended or adjusted under 35 U.S.C. 154(b) by 670 days.

(21) Appl. No.: 12/529,406

(22) PCT Filed: Mar. 5, 2008

(86) PCT No.: PCT/EP2008/001757
§ 371 (c)(1),
(2), (4) Date: Sep. 1, 2009

(87) PCT Pub. No.: WO2008/107178
PCT Pub. Date: Sep. 12, 2008

(65) Prior Publication Data
US 2010/0014207 A1 Jan. 21, 2010

(30) Foreign Application Priority Data

Mar. 6, 2007 (DE) .......................... 10 2007 010 896

(51) Int. Cl.
*G08C 19/00* (2006.01)
(52) U.S. Cl. ........................................................ 341/176
(58) Field of Classification Search .................... 307/104
See application file for complete search history.

(56) References Cited

U.S. PATENT DOCUMENTS

| 4,031,434 | A | | 6/1977 | Perron | |
|---|---|---|---|---|---|
| 5,351,042 | A | * | 9/1994 | Aston | 340/5.61 |
| 5,479,799 | A | * | 1/1996 | Kilman et al. | 70/231 |
| 7,554,316 | B2 | * | 6/2009 | Stevens et al. | 323/355 |
| 2007/0176738 | A1 | * | 8/2007 | Horler | 340/5.61 |

FOREIGN PATENT DOCUMENTS

| EP | 0505084 A1 | 9/1992 |
|---|---|---|
| WO | 2006016149 A1 | 2/2006 |

OTHER PUBLICATIONS

International Search Report in PCT/EP2008/001757, Oct. 31, 2008.

* cited by examiner

*Primary Examiner* — Hal Kaplan
(74) *Attorney, Agent, or Firm* — Bacon & Thomas, PLLC

(57) ABSTRACT

An apparatus for actuating an actuator having an energy storage for supplying the actuator, an integrated circuit for controlling the energy supply from the energy storage to the actuator and an antenna device. Additionally, an interface module that is configured as a separate unit relative to the integrated circuit is connected to the antenna device for the contactless transmission of energy for the energy storage and of data for a communication with the integrated circuit.

17 Claims, 2 Drawing Sheets

DEVICE FOR ACTUATING AN ACTUATOR

FIELD OF THE INVENTION

The invention relates to an apparatus for actuating an actuator. Furthermore the invention relates to an interface module for such an apparatus, a system having an actuator and an emitter in addition to such an apparatus, as well as a method for actuating an actuator.

BACKGROUND

For the purpose of activating an actuator with the aid of an integrated circuit it is already known to extend a connection between an energy source and the actuator. Such an actuator control can for example be used in an electronic lock cylinder. In this application case the actuator is configured as a lock magnet. A battery integrated in the electronic lock cylinder serves as energy source for operating the integrated circuit and the lock magnet. According to this principle electronic lock cylinders of a very high quality can be realized. There is the risk, however, that an electronic lock cylinder fails to function since the battery no longer has a sufficient state of charge. This can also happen in application cases where the lock magnet is activated comparatively infrequently, since the integrated circuit constantly consumes energy and thereby gradually discharges the battery.

It is furthermore known from Klaus Finkenzeller, RFID-Handbuch (RFID hand book), 3rd edition (2002) pages 81-85, to regulate the supply voltage of a transponder to a constant value. The transponder is an electronic circuit configuration which exchanges data with a communication partner in a contactless fashion. The transponder can be configured in such a fashion that it obtains the supply voltage required for its operation by means of a coil which is also used for the data transmission from the field generated for the data transmission. To regulate the supply voltage the transponder can have a shunt controller by means of which the quality of the oscillating circuit and consequently the transponder's supply voltage can be adjusted by connecting a controllable resistor in parallel with the transponder's coil.

Finally it is known to charge electric apparatus, for example an electric toothbrush, by coupling them in a contactless fashion with a charging device. For the purpose of operation such an apparatus is removed from the charging device and is manually switched on by means of a switch arranged on the apparatus.

SUMMARY

It is the object of the invention to enable a contactless triggering of the activation of an actuator in an as simple and reliable fashion as possible.

The inventive apparatus for actuating an actuator has an energy storage for supplying the actuator, an integrated circuit for controlling the energy supply from the energy storage to the actuator and an antenna device. The inventive apparatus is special in that to the antenna device an interface module is connected that is configured as a separate unit relative to the integrated circuit and serves for the contactless transmission of energy for the energy storage and of data for a communication with the integrated circuit.

The invention has the advantage that the integrated circuit does not need to have any analogous high-frequency components and consequently standard circuits can be used that can be obtained cost-effectively. Apart from this merely an energy storage is required with a relatively small capacitance that is sufficient for activating the actuator once. A further advantage consists in the great operational reliability of the inventive apparatus, which results from the fact that the energy storage can be charged via the interface component, so that in a simple fashion a sufficient amount of energy can always be provided for activating the actuator, and the risk of inoperability due to an insufficiently charged energy storage is very small. In addition the battery change required in known apparatus can be omitted. Finally it is also advantageous that also actuators with great power consumption can be operated for a short time.

Preferably a switching device is provided for connecting the energy storage with the actuator. In an advantageous embodiment of the invention a connection can be established by means of the switching device between the energy storage and the actuator, without interrupting the energy supply from the antenna device to the energy storage. It is thereby achieved that the actuator is supplied by the energy storage for a longer period of time and that consequently the efficiency of the inventive apparatus is improved. It is furthermore advantageous when the energy storage serves exclusively to supply the actuator and not to supply the integrated circuit. Thereby a high degree of availability of the energy storage for activating the actuator can be granted.

The interface component is preferably configured for a simultaneous transmission of energy and data. Thereby for example a communication of the integrated circuit via the interface component is rendered possible during the charging of the energy storage, so that the overall time required for activating the actuator can be kept little.

The interface component can have a regulating circuit for regulating a voltage generated by the antenna device to a constant value. The regulated voltage can be supplied to the integrated circuit as operating voltage, so that also the integrated circuit can be supplied out of the transmitted energy and does not need an energy source of its own. It is furthermore advantageous when a charging current for charging the energy storage can be output from the regulating circuit. This renders possible an efficient use of the transmitted energy and a fast charging of the energy storage.

The interface component can have a modulation device, in particular a load modulator. This enables the integrated circuit to send data in a contactless fashion. The modulation device can preferably be activated directly by the integrated circuit. Furthermore the interface component can have a signal forming device coupled with the antenna device for transforming a signal received by the antenna device into a digital signal in particular of the same frequency. Such a signal can be processed by the integrated circuit without any problem.

For the purpose of protection against an unauthorized activation of the actuator the integrated circuit can be configured so that cryptographic operations can be executed with it. The integrated circuit is in particular configured as a chip for chip cards. Such chips have a high security standard and can be obtained cost-effectively.

The energy storage is preferably configured as a capacitor. A capacitor can supply a high current for a short time and is therefore particularly suitable for activating the actuator. The actuator can for example form part of a closing device.

The inventive interface component is characterized in that it is configured as a separate unit relative to the integrated circuit, and that it can be used for the contactless transmission of energy for the energy storage and of data for a communication with the integrated circuit.

The inventive system for actuating an actuator has an external device in addition to the inventive control device. Depending on the control device the actuator can be actuated by a signal of the external device that is transmitted in a contactless fashion.

In the inventive method for actuating an actuator with a control device a signal is transmitted in a contactless fashion to the control device and, in dependence on the signal, the actuator is connected to an energy storage of the control device. The inventive method is characterized in that the signal is transmitted in a contactless fashion to an interface component of the control device, via which interface component the control device is supplied in a contactless fashion with energy for charging the energy storage.

BRIEF DESCRIPTION OF THE DRAWINGS

In the following the invention will be explained with reference to the embodiments represented in the drawing.

The figures are described as follows.

DETAILED DESCRIPTION OF VARIOUS EMBODIMENTS OF THE DISCLOSURE

Figure 1:
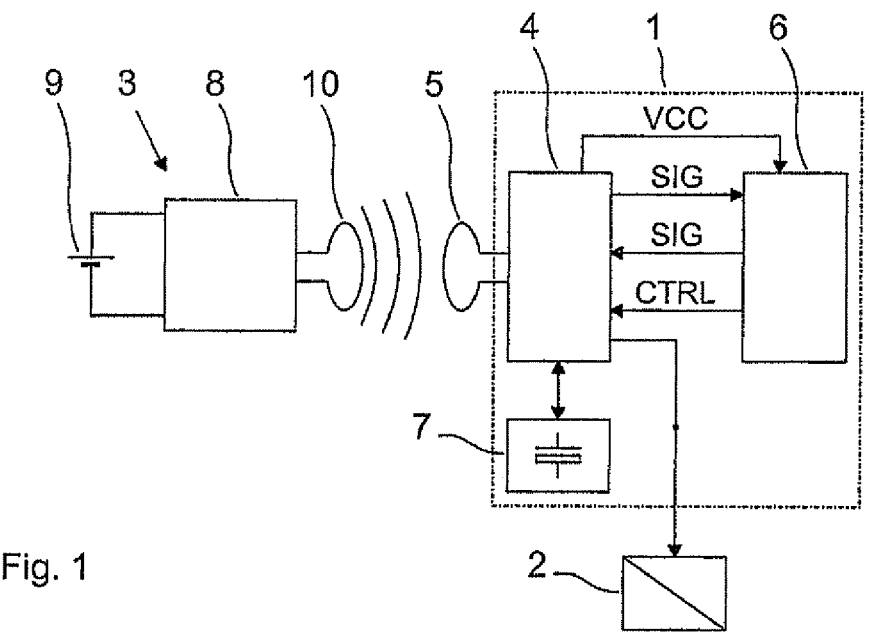
FIG. 1 a schematic view of an embodiment of the inventive system.

FIG. 1 shows a schematic view of an embodiment of the inventive system. The system has a control device 1 for actuating an actuator 2 and an external device 3. The control device 1 consists of an interface component 4, to which an antenna coil 5 is connected, a smartcard chip 6 and a capacitor 7 for storing energy, which is connected to the interface component 4. The external device 3 has an electronic system 8, which is supplied with voltage by a battery 9 and to which the one device antenna 10 is connected.

The actuator 2 can for example be a lock magnet for battery-free locks of bank-note cassettes or also for door locks. Likewise the actuator 2 can also be another optical, acoustic, electrothermal, electrochemical, thermomechanic, electromechanic, electromagnetic, etc. device which, due to its high energy consumption or due to its high starting current, cannot be charged directly by the antenna coil 5.

Figure 2:
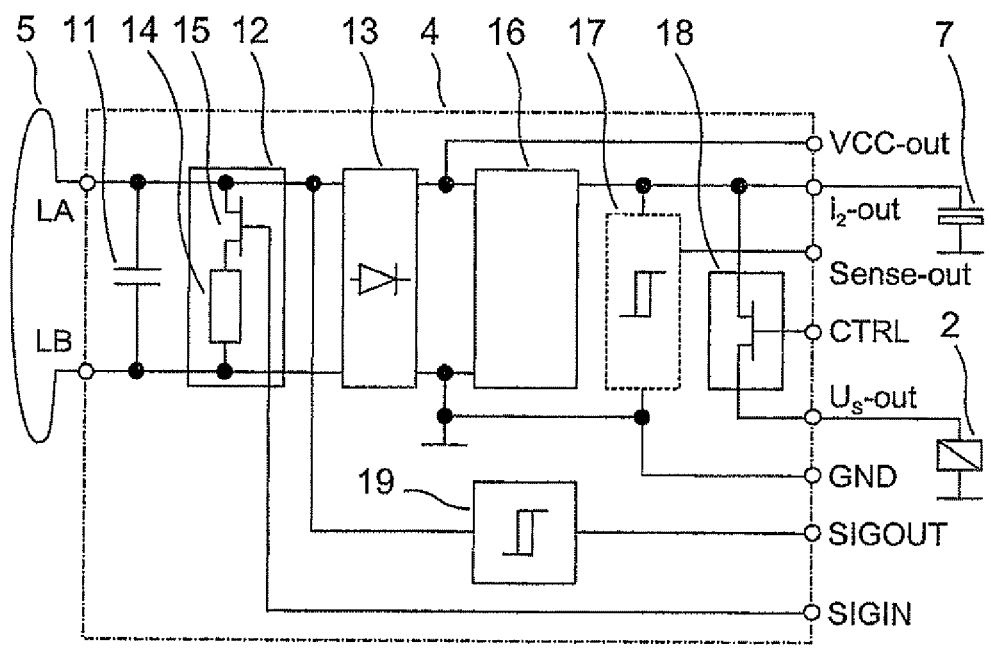
FIG. 2 a simplified block diagram of an embodiment of the interface component.

The interface component 4 is configured for contactless data transmission in the high-frequency range, for example in the 13.56 MHz range, and is represented in detail in FIG. 2. The antenna coil 5 is for example coiled of wire and adapted to the provided frequency range.

The smartcard chip 6 is an integrated circuit which is used predominantly in chip cards. A suitable smartcard chip 6 is for example available under the name P5CN072 from the company Philips. The smartcard chip 6 has the ability to communicate via the interface component 4 and for this purpose can for example generate and decode the signals required at an ISO/IEC 14443 interface. A subcarrier of 848 kHz is used here and a coding takes place in the base band according to a Manchester code or a Miller code. For this purpose, one signal path is provided in each case from the interface component 4 to the smartcard chip 6 and in the reverse direction for transmitting signals SIG. Furthermore a connection is provided between the interface component 4 and the smartcard chip 6 via which the smartcard chip 6 is supplied with an operating voltage VCC by the interface component 4, as well as a connection for transmitting a control signal CTRL from the smartcard chip 6 to the interface component 4.

The inventive system is based on the following functional principle:

The device antenna 10 of the external device 3 is approximated to the antenna coil 5 of the control device 1. From the device antenna 10 of the external device 3 energy is thus transmitted to the antenna coil 5 of the control device 1 via an alternating magnetic field and after processing by the interface component 4 is used to operate the smartcard chip 6 and to charge the capacitor 7. In the same way a data transmission takes place from the external device 3 to the smartcard chip 6 and if required also in the reverse direction. Via this data transmission it is for example possible to authenticate the external device 3 to the smartcard chip 6 and to transmit a command for activating the actuator 2 to the smartcard chip 6. After a successful authentication the smartcard chip 6 executes the command and prompts the interface component 4 to connect the capacitor 7 through to the actuator 2. This results in the discharge of the capacitor 7 via the actuator 2 and thereby the activation of the actuator 2. The discharging process takes place much faster than the previously carried out charging process, so that correspondingly higher current intensities can be achieved.

When the actuator 2 is configured for example as a lock magnet of a battery-free door opener, the door opener can be actuated in the described fashion. The actuator 2 can also be integrated in a lock of a cash cassette or another locking device. In all cases a high degree of availability is given in the inventive system, since the capacitor 7 is in each case charged directly before the activation of the actuator 2.

FIG. 2 shows a simplified block diagram of an embodiment of the interface component 4. The antenna coil 5 is connected to two connectors of the interface component 4, which are referred to as LA and LB. In the vicinity of the connectors LA and LB a capacitance 11 is drawn, which represents the input capacitance of the interface component 4 for the connectors LA and LB. Internally there is connected to the connectors LA and LB a load modulator 12 which is followed downstream by a rectifier 13 with its alternating current side. The load modulator 12 has a load resistor 14 which can be connected in parallel with the connectors LA and LB via a transistor 15, and which then puts a corresponding load on the antenna coil 5.

The rectifier 13 is followed downstream on its direct current side by a shunt controller 16, which will be explained in greater detail with reference to FIG. 3. Optionally a voltage detector 17 is connected downstream of the shunt controller 16. A connector of the voltage detector 17 is connected to a switch component 18 and an input/output of the interface component 4, which is referred to as $i_2$-out and to which the capacitor 7 is connected. The switch component 18 is furthermore connected to an output Us-out of the interface component 4, to which the actuator 2 is connected. The control line of the switch component 18, which in the represented embodiment is configured as a transistor, is connected to an input CTRL of the interface component 4.

The interface component 4 furthermore has a signal former 19 which is connected between the load modulator 12 and the alternating current side of the rectifier 13 to a line to the connector LA and which is in addition connected to an output SIGOUT of the interface component 4. A control electrode of the transistor 15 is connected to an input SIGIN of the interface component 4. Furthermore the interface component 4 has an operating voltage output VCC-out and a ground connection GND, which are respectively connected to a connecting line between the rectifier 13 and the shunt controller 16.

Finally in the interface component 4 an output Sense-out is provided, which is connected to a corresponding connector of the voltage detector 17.

When the antenna coil 5 is disposed in a magnetic high-frequency field generated by the external device 3, a high-frequency voltage is induced in the antenna coil 5 and fed to the connectors LA and LB of the interface component 4. The high-frequency field has for example a frequency in the range of 13.56 MHz. The rectifier 13 rectifies the high-frequency voltage and supplies the thus generated direct voltage to the shunt controller 16. The shunt controller 16 regulates the direct voltage to a constant value, so that at the output VCC-out a constant direct voltage can be collected as operating voltage VCC for the smartcard chip 6. This is necessary for example for the reason that the voltage induced in the antenna coil 5 depends on the field strength of the magnetic field in the place of the antenna coil 5. Furthermore the shunt controller 16 provides a current $i_2$ for charging the capacitor 7. The current $i_2$ is supplied to the capacitor 7 via the input/output $i_2$-out of the interface component 4 and is limited by the shunt controller 16 in such a fashion that no losses in the operating voltage VCC occur.

The state of charge of the capacitor 7 is monitored by the voltage detector 17, which detects the voltage respectively applied to the capacitor 7. The voltage detector 17 compares the voltage applied to the capacitor 7 with at least one comparative value and, depending on the result of the comparison, outputs at least one status value at the output Sense-out of the interface component 4. The status value can for example state whether the capacitor 7 is charged or not. In case the voltage detector 17 has an A/D converter, the state of charge can also be monitored in several discrete steps that respectively refer to a voltage interval for the voltage applied to the capacitor 7.

When a sufficient state of charge of the capacitor 7 is given, the actuator 2 can be activated by connecting through the switch component 18 and thereby discharging the capacitor 7 via the actuator 2. Through the represented circuit configuration it is achieved here that when the switch component 18 is connected through, in addition to the discharge current of the capacitor 7, the actuator 2 is supplied with the current $i_2$ output by the shunt controller 16. In principle it is also possible to connect the switch component 18 in such a fashion that it connects the capacitor 7 either with the shunt controller 16 or with the actuator 2. In this case, however, the actuator 2 is activated exclusively through the discharge current of the capacitor 7. The switch component 18 can also be arranged outside the interface component 4.

The connecting through of the switch component 18 is prompted by applying a corresponding control signal to the control input CTRL of the interface component 4. The control signal is generated by the smartcard chip 6 which is requested accordingly by the external device 3 represented in FIG. 1. The communication between the external device 3 and the smartcard chip 6 takes place in a contactless fashion and is handled by the interface component 4.

For transmitting data from the external device 3 to the smartcard chip 6 the device antenna 10 of the external device 3 generates a correspondingly modulated high-frequency alternating magnetic field, which induces a high-frequency alternating voltage in the antenna coil 5 of the interface component 4. This alternating voltage is transformed by the signal former 19 into a digital signal of the same frequency, for example a TTL signal, and supplied to the smartcard chip 6 via the output SIGOUT. The signal former 19 can for example be configured as a Schmitt trigger or a comparator circuit and, in dependence on its internal signal threshold, can reproduce different modulation degrees as digital signals. Here the signal former 19 outputs a digital signal respectively only in the case that the alternating voltage fed to the signal former 19 exceeds the signal threshold. Below the signal threshold the signal former 19 does not output a digital signal. Hence, when the signal threshold is adjusted correspondingly, for example a 10% ASK-modulated data signal with an NRZ coding (ISO/IEC 14443 Type B) for the logical bit sequence "1010" can be output as a 13.56 MHz clock signal in the sequence "on-off-on-off". ASK therein stands for amplitude shift keying and NRZ coding means that a binary "1" is represented by a high amplitude and a binary "0" is represented by a low amplitude. Such a digital signal can be processed by the smartcard chip 6.

The smartcard chip 6 evaluates the digital signal and prompts for example an activation of the actuator 2. In order to prevent an abusive activation of the actuator 2 the activation command transmitted by the external device 3 can be secured cryptographically and/or an authentication of the external device 3 can be required for activation. The smartcard chip 6 is configured in such a fashion that it can carry out the necessary cryptographic operations. In dependence on the type of cryptographic securing also a data transmission from the smartcard chip 6 to the external device 3 can be necessary.

The data transmission from the smartcard chip 6 to the external device 3 takes place in an equally contactless fashion via the interface component 4. Therein the smartcard chip 6 feeds the digital signal to be transmitted to the input SIGN of the interface component 4. The signal is for example a 848 kHz TTL signal. This signal can be ASK modulated and have a Manchester coding (ISO/IEC 14443 Type A). Likewise also a BPSK-modulated signal with an NRZ coding (ISO/IEC 14443 Type B) is possible. BPSK here stands for binary phase shift keying and refers to a modulation method in which a switching takes place between two phase states. The digital signal fed to the interface component 4 is supplied directly to the load modulator 12 and there is applied to the control electrode of the transistor 15. This means that the load of the antenna coil 5 varies according to the clock pulse of the data signal. Through the alternating magnetic field generated by the external device 3 this variation acts reversely on the external device 3 and can be evaluated there with regard to the data content.

To display the operation state of the regulating circuit 1 a light-emitting diode can be connected to the output VCC-out of the interface component 4, which diode shows that a sufficient operating voltage VCC is given. Alternatively or additionally a light-emitting diode can be connected in parallel to the capacitor 7, in order to optically display the state of charge of the capacitor 7. Likewise it is also possible to activate a light-emitting diode by means of the signal at the output Sense-out of the interface component 4.

Figure 3:
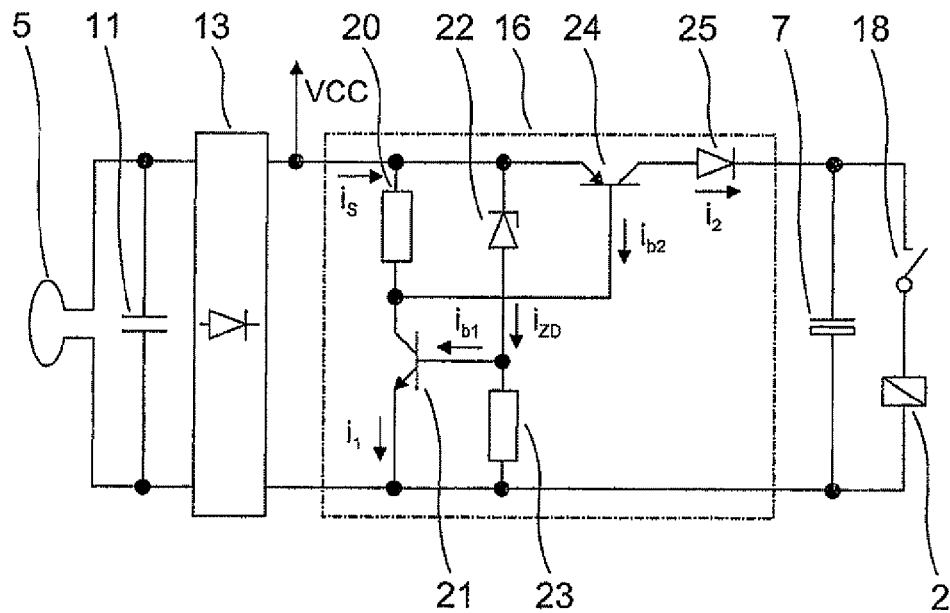
FIG. 3 a circuit diagram of an embodiment of the shunt controller.

FIG. 3 shows a circuit diagram of an embodiment of the shunt controller 16. Additionally, FIG. 3 shows some components of the external wiring of the shunt controller 16. As regards connections, the shunt controller 16 is arranged between the direct-voltage side of the rectifier 13 and the capacitor 7, wherein a ground wire is looped through from the rectifier 13 to the capacitor 7. The operating voltage VCC for the smartcard chip 6 can be collected between the rectifier 13 and the shunt controller 16. To the alternating-voltage side of the rectifier 13 the antenna coil 5 is connected, to which the input capacitance 11 of the interface component 4, which was already represented in FIG. 2, is connected in parallel. The actuator 2 is arranged in parallel connection to the capacitor 7 and can be connected to the capacitor 7 via the switch component 18.

The shunt controller 16 has a series connection consisting of a resistor 20 and a control transistor 21 and a series connection of a Zener diode 22 and a resistor 23 which are respectively connected in parallel to the direct-voltage side of the rectifier 13. Furthermore the shunt controller 16 has a series connection of a control transistor 24 and a diode 25, via which the capacitor 7 is connected to the direct-voltage side of the rectifier 13. The base of the control transistor 21 is connected to the connecting line between the Zener diode 22 and the resistor 23. The base of the control transistor 24 is connected to the connecting line between the resistor 20 and the control transistor 21. The Zener diode 22 is arranged in reverse direction, the diode 25 is arranged in forward direction.

The shunt controller 16 regulates the operating voltage VCC to a constant value. In the case that this value is exceeded, first the Zener diode 22 becomes conductive and a current $i_{ZD}$ flows through it. This results in a base current $i_{b1}$ of the control transistor 21, so that the resistance of the control transistor 21 diminishes and enables a base current $i_{b2}$ of the control transistor 24. As a consequence of the base current $i_{b2}$ the control transistor 24 becomes conductive, so that a current $i_2$ flows through the diode 25 to the capacitor 7 and charges the same. Since the current $i_{ZD}$ leads to a feedback, the current $i_2$ adjusts itself in such a fashion that the operating voltage VCC is maintained constant. Due to the current amplification of the control transistor 24 even a very little current $i_1$ through the control transistor 21 is sufficient to render the control transistor 24 conductive. Thus the great majority of the total current is fed from the direct-voltage side of the rectifier 13 to the shunt controller 16 is first supplied to the capacitor 7 as current $i_2$. With increasing charge of the capacitor 7 the charging current that can be generated by a given voltage decreases, so that the current $i_2$ can finally no longer take on assume values that are sufficiently high to regulate the operating voltage VCC. This results in an increase of the operating voltage VCC, which in turn leads to an increase of the current $i_{ZD}$. Accordingly the base current $i_{b1}$ of the control transistor 21 increases, so that the resistance of the control transistor 21 diminishes and thereby enables an increasing current $i_1$. The thus generated increase of the current $i_s$ leads to a reduction of the operating voltage VCC.

All in all the operating voltage VCC is regulated to a constant value by the shunt controller 16 through regulating the current $i_s$ which consists of the currents $i_1$ and $i_2$. Proceeding from a largely discharged capacitor 7 first the current $i_2$, with which the capacitor 7 is charged, represents the major part of the current $i_s$. With increasing charge of the capacitor 7 a point is reached at which the ratio of the current $i_2$ in the current $i_s$ starts to decrease and the ratio of the current $i_1$ starts to increase. When the capacitor 7 is charged completely the current $i_s$ then corresponds to the current $i_1$. It is thereby ensured that the operating voltage VCC remains constant also during the charging of the capacitor 7 and thus the functionality of the smartcard chip 6 is not affected by the charging process. Thus an unlimited communication with the smartcard chip 6 is possible at any time.

Figure 4:
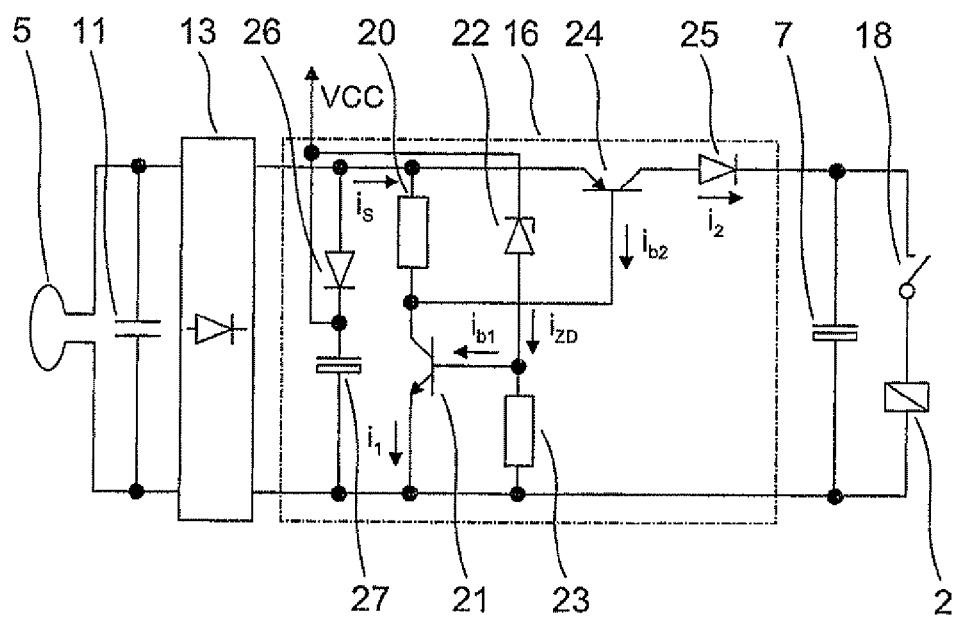
FIG. 4 a circuit diagram of a further embodiment of the shunt controller.

FIG. 4 shows a circuit diagram of a further embodiment of the shunt controller 16. The basic structure of the shunt controller 16 corresponds to the embodiment represented in FIG. 3. In the embodiment of FIG. 4 the operating voltage VCC is collected via a diode 26 connected in forward direction. Between this collection point and the ground wire a smoothing capacitor 27 is connected, which smoothes the operating voltage VCC. Furthermore also the Zener diode 22 provided in the embodiment of FIG. 3 is connected in reverse direction between the collection point of the operating voltage VCC and the basis of the control transistor 21. Through the variation of the shunt controller 16 represented in FIG. 4 an improved smoothing of the operating voltage is achieved in comparison to the embodiment of FIG. 3.

In the embodiments of FIG. 3 and 4 instead of the control transistors 21 and 24 also different components can be used, whose resistance can be regulated through corresponding activation.

In addition to the already mentioned applications the inventive apparatus can for example also be used as an implantable unit, in particular in a sterile cover, for medical purposes. Therein the actuator 2 can be configured among other things as a miniature pump, a dosing device or membrane, e.g. for dosing medicines. If necessary the actuator 2 can also be set into operation from the outside. An authentication can be used to prevent misuse by unauthorized persons.

The invention claimed is:

1. An apparatus for actuating an actuator, comprising:
   an energy storage supplying energy to the actuator;
   an integrated circuit controlling the energy supply from the energy storage to the actuator, wherein the integrated circuit is configured as a chip for chip cards;
   an antenna device; and
   an interface component configured as a separate unit relative to the chip having the integrated circuit, said interface component connected to the antenna device, wherein the interface component is arranged to transmit energy contactlessly to the energy storage and to transmit data for a communication with the integrated circuit.

2. The apparatus according to claim 1, including a switching device connecting the energy storage to the actuator.

3. The apparatus according to claim 2, wherein the switching device is arranged so that a connection is enabled between the energy storage and the actuator by the switching device, without interrupting the energy supply from the antenna device to the energy storage.

4. The apparatus according to claim 1, wherein the energy storage exclusively supplies the actuator and does not supply the integrated circuit.

5. The apparatus according to claim 1, wherein the interface component is configured for simultaneous transmission of energy and data.

6. The apparatus according to claim 1, wherein the interface component has a regulating circuit arranged to regulate voltage generated by the antenna device to a constant value.

7. The apparatus according to claim 6, wherein regulated antenna generated voltage is supplied to the integrated circuit as operating voltage (VCC).

8. The apparatus according to claim 6, wherein a charging current for charging the energy storage is output from the regulating circuit.

9. The apparatus according to claim 1, wherein the interface component comprises a modulation device.

10. The apparatus according to claim 9, wherein the modulation device is activatable directly by the integrated circuit.

11. The apparatus according to claim 1, wherein the interface component includes a signal forming device coupled with the antenna device for transforming a signal received by the antenna device into a digital signal.

12. The apparatus according to claim 1, wherein the integrated circuit is arranged to enable cryptographic operations to be carried out.

13. The apparatus according to claim 1, wherein the energy storage is configured as a capacitor.

14. The apparatus according to claim 1, wherein the actuator constitutes a part of a locking device.

15. A system for actuating an actuator, comprising an external device and a control device, wherein the actuator is arranged to be actuated by the control device in dependence on a signal of the external device that is transmitted in a contactless fashion, wherein the control device is configured according to claim 1.

16. An interface component for an apparatus for actuating an actuator, comprising;
   an energy storage for supplying the actuator;
   an integrated circuit for controlling the energy supply from the energy storage to the actuator, wherein the integrated circuit is configured as a chip for chip cards;
   an antenna device; and
   said interface component configured as a separate unit relative to the chip having the integrated circuit, wherein the interface component is configured to enable transmittal of energy for the energy storage and data for a communication with the integrated circuit in a contactless manner.

17. A method for actuating an actuator using a control device, said control device comprising an energy storage for supplying energy, an integrated circuit controlling the energy supply from the energy storage to the actuator, an antenna device, and an interface component, wherein the actuator is connected to the energy storage, comprising the steps:
   transmitting a signal to the interface component of the control device in a contactless fashion and,
   supplying energy via said interface component in a contactless manner to the control device to thereby charge the energy storage,
   wherein the integrated circuit is configured as a chip for chip cards and the interface component is configured as a separate unit relative to the chip having the integrated circuit.

* * * * *